United States Patent
Kamal et al.

(10) Patent No.: US 9,746,236 B2
(45) Date of Patent: Aug. 29, 2017

(54) SPRAY FREEZE-DRIED NANOPARTICLES AND METHOD OF USE THEREOF

(71) Applicant: THE ROYAL INSTITUTION FOR THE ADVANCEMENT OF LEARNING/MCGILL UNIVERSITY, Montreal (CA)

(72) Inventors: Musa Kamal, Westmount (CA); Vahid Khoshkava, Montréal (CA)

(73) Assignee: THE ROYAL INSTITUTION FOR THE ADVANCEMENT OF LEARNING/MCGILL UNIVERSITY, Montréal (CA)

( * ) Notice: Subject to any disclaimer, the term of this patent is extended or adjusted under 35 U.S.C. 154(b) by 0 days.

(21) Appl. No.: 14/686,050

(22) Filed: Apr. 14, 2015

(65) Prior Publication Data

US 2015/0307692 A1    Oct. 29, 2015

Related U.S. Application Data

(60) Provisional application No. 61/984,265, filed on Apr. 25, 2014.

(51) Int. Cl.

| | |
|---|---|
| C08L 1/04 | (2006.01) |
| F26B 5/06 | (2006.01) |
| C08B 15/02 | (2006.01) |
| C08K 9/08 | (2006.01) |
| C08K 7/26 | (2006.01) |

(52) U.S. Cl.
CPC ............... *F26B 5/06* (2013.01); *C08B 15/02* (2013.01); *C08K 9/08* (2013.01); *C08L 1/04* (2013.01); *F26B 5/065* (2013.01); *C08K 7/26* (2013.01)

(58) Field of Classification Search
None
See application file for complete search history.

(56) References Cited

PUBLICATIONS

Y. Peng, D. Gardner, Y. Han. Drying cellulose nanofibrils: in search of a suitable method. Cellulose 2012, 19, 91-102.*
S. Beck, J. Bouchard, R. Berry. Dispersibility in water of dried nanocrystalline cellulose. Biomacromolecules 2012, 13, 1486-1494.*
V. Khoshkava, M. R. Kamal. Effect of Cellulose Nanocrystals (CNC) Particle Morphology on Dispersion and Rheological and Mechanical Properties of Polypropylene/CNC Nanocomposites. Appl. Mater. Interfaces 2014, 6, 8146-8157.*
V. Khoshkava, M. R. Kamal. Effect of drying conditions on cellulose nanocrystal (CNC) agglomerate porosity and dispersibility in polymer nanocomposites. Powder Technology 2014, 261, 288-298.*
H. Leuenberger. Spray freeze-drying—the process of choice for low water soluble drugs? Journal of Nanoparticle Research 2002, 4, 111-119.*

(Continued)

*Primary Examiner* — Richard A Huhn
(74) *Attorney, Agent, or Firm* — Norton Rose Fulbright Canada LLP

(57) ABSTRACT

The present disclosure relates to a process for reducing particle agglomeration and/or increasing porosity of agglomerated particles, a method for enhancing dispersion of nanoparticles in a polymer matrix, and thermoplastic or thermoset nanocomposites comprising nanoparticles.

9 Claims, 11 Drawing Sheets

(56) References Cited

PUBLICATIONS

W. S. Cheow, M. L. L. Ng, K. Kho, K. Hadinoto. Spray-freeze-drying production of thermally sensitive polymeric nanoparticle aggregates for inhaled drug delivery: Effect of freeze-drying adjuvants. International Journal of Pharmaceutics 2011, 404, 289-300.*

V. Khoshkava. Polypropylene (PP) nanocomposites incorporating nanocrystalline cellulose (NCC). PhD thesis. Department of Chemical Engineering McGill Univeristy, Montreal, Canada. 2014.*

* cited by examiner

SPRAY FREEZE-DRIED NANOPARTICLES AND METHOD OF USE THEREOF

CROSS-REFERENCE TO RELATED APPLICATIONS

This application claims priority on U.S. Provisional Patent Application No. 61/984,265 filed on Apr. 25, 2014, the entire content of which is incorporated herein by reference.

BACKGROUND OF THE DISCLOSURE

Reinforcing agents are added to polymers to improve the physical, thermal, mechanical, and electrical properties of the matrix. One of the key issues with achieving optimal benefit from the reinforcement is dispersion in the matrix. In dispersive mixing, agglomerates are broken down and the particle size of the dispersed phase is reduced.

Nanoparticles are an attractive reinforcing agent for polymers due to their small size and large surface-to-volume ratio. As well, their small size allows nanoparticles to provide property improvement without imparting directional-dependence. Materials such as clay and nanocrystalline cellulose (NCC) are becoming more commonplace as reinforcements and the market for these reinforcements is expected to grow.

However, nanoparticles suffer from the same issues as other reinforcements with respect to dispersion. Mixing must be sufficient in order for the particles to disperse properly, yet the temperature cannot become too elevated or the particles may degrade.

Cellulose nanocrystal (CNC) hereafter referred to also as nanocrystalline cellulose (NCC), discovered in 1949 by Bengt Ranby, was prepared from acid hydrolysis of naturally existing cellulose semicrystals. It is abundant, renewable and biodegradable, CNC can be used as a building block for the preparation of various functional nano-materials as it possesses a number of advantages, such as low density, high specific surface area, and superior mechanical properties. The numerous hydroxyl groups on the nanocrystal surface can be used to modify CNC.

SUMMARY OF THE DISCLOSURE

In one embodiment, there is provided a process for producing porous agglomerated nanoparticles comprising i) dispersing an agglomerated material in a liquid medium to provide a dispersion; and ii) spray freeze-drying said dispersion.

In one aspect, there is provided spray freeze-dried nanocrystalline cellulose (SFD-NCC) or spray freeze-dried clay prepared by the process as defined herein.

In one aspect, there is provided spray freeze-dried nanocrystalline cellulose (SFD-NCC) wherein the ratio of Brunauer-Emmett-Teller (BET) surface area of SFD-NCC over spray dried nanocrystalline cellulose (SD-NCC) or freeze-dried nanocrystalline cellulose (FD-NCC) is:

$$\frac{SFD\text{-}NCC}{SD\text{-}NCC \text{ or } FD\text{-}NCC} \geq \text{about } 10$$

In one aspect, there is provided a process for producing NCC agglomerates with enhanced porosity and BET surface area material comprising:

i) dispersing said material in an aqueous medium to provide a dispersion; and
ii) spray freeze-drying said dispersion.

In one aspect, there is provided a method for enhancing dispersion of nanoparticles in a polymer matrix, said method comprising spray freeze-drying said nanoparticles before dispersing in said polymer.

In one aspect, there is provided a process for preparing a polymer nanocomposite comprising:
i) providing a spray freeze-dried nanoparticle; and
ii) dispersing said spray freeze-dried nanoparticles in said polymer.

In one aspect, there is provided thermoplastic or thermoset nanocomposites comprising dispersed spray freeze-dried NCC or clay nanoparticles in a thermoplastic or thermoset polymer matrix.

In one aspect, there is provided a method for modulating at least one mechanical property of a polymer composite, said method comprising dispersing spray freeze-dried NCC or clay nanoparticles in said polymer.

BRIEF DESCRIPTION OF THE DRAWINGS

The drawings are described briefly as follows.

DETAILED DESCRIPTION OF THE EMBODIMENTS

Figure 1:
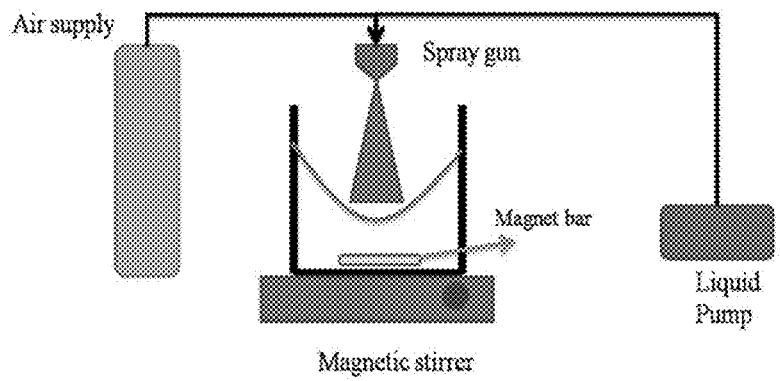
FIG. 1 illustrates a spray freeze-drying setup as used herein.

In one embodiment, the process for producing porous agglomerated nanoparticles is comprising i) dispersing NCC or clay in a liquid medium to provide a NCC or clay dispersion; and ii) spray freeze-drying said dispersion.

In one embodiment, said dispersion is NCC dispersion. In one embodiment, the agglomerated material is a NCC powder. In one embodiment, the agglomerated material is a clay.

In one embodiment, said liquid medium is consisting essentially of water. In one embodiment, said liquid medium is water or preferably distilled or deionized water. In one embodiment, the dispersion is comprising up to about 10 wt % NCC in said liquid medium, preferably about 0.5 to about 10% or about 0.5 to about 5% or about 0.5 to about 1%.

In one embodiment, there is provided spray freeze-dried NCC or spray freeze-dried clay.

In one embodiment, there is provided spray freeze-dried NCC or spray freeze-dried clay prepared by the process as defined herein.

In one embodiment, the spray freeze-dried NCC has a ratio of Brunauer-Emmett-Teller (BET) surface area of SFD-NCC over spray dried nanocrystalline cellulose (SD-NCC) or freeze-dried nanocrystalline cellulose (FD-NCC):

$$\frac{SFD\text{-}NCC}{SD\text{-}NCC \text{ or } FD\text{-}NCC} \geq \text{about } 10$$

In one embodiment, the BET ratio is greater than or equal to about 20, or between about 20 and about 50.

In one embodiment, there is provided a process for producing porous agglomerates of a material comprising i) dispersing said material in a liquid medium to provide a dispersion; and ii) spray freeze-drying said dispersion. In one embodiment, said material is NCC or clay. In one embodiment, the dispersion is comprising up to about 10 wt % NCC in said liquid medium, preferably about 0.5 to about 10% or about 0.5 to about 5% or about 0.5 to about 1%.

In one embodiment, there is provided a method for enhancing dispersion of nanoparticles in a polymer matrix, said method comprising spray freeze-drying said nanoparticles before dispersing in said polymer.

In one embodiment, there is provided a process for preparing a polymer nanocomposite comprising i) providing a spray freeze-dried nanoparticle; and ii) dispersing said spray freeze-dried nanoparticles in said polymer.

In one embodiment, there is provided a method for modulating at least one mechanical property of a polymer composite, said method comprising dispersing spray freeze-dried NCC or clay nanoparticles in said polymer. In one embodiment, said property is increased tensile strength or modulus of the composite.

In one embodiment, in the process, method or composites defined herein, the nanoparticles are one of nanocrystalline cellulose and clay.

In one embodiment, there is provided thermoplastic and thermoset nanocomposites comprising dispersed spray freeze-dried NCC or clay nanoparticles in a thermoplastic or thermoset polymer matrix.

In one embodiment, in the process, method or composites defined herein, the polymer or polymer matrix is comprising polypropylene, polyethylene, polylactic acid, poly(methyl methacrylate), polyurethane, epoxy or polystyrene.

In one embodiment, in the composites defined herein, said composite is comprising at least about 0.1 wt % SFD-NCC, or at least about 0.5 wt %, or preferably from about 0.1 to about 10% or about 0.5% to about 10% or about 0.5% to about 7%, or about 0.5% to about 6%, or about 0.5% to about 5% or about 0.5% to about 5% or about 0.5 to about 1%.

CNC can be prepared from the acid hydrolysis of wood fibers using sulfuric acid, leaving behind small fractions of carboxylic and sulfate ester groups on the surface of CNC. The negatively-charged sulfate groups allow the CNC to disperse well in water. The dimensions of CNC are typically about 5-20 nm in diameter and 100-200 nm in length.

Experimental

Spray drying is a technique used to produce dry powder from an aqueous suspension. As the process involves evaporation and diffusion, the structure of the final powder is not homogenous. Spray freeze-drying is a cryogenic atomization technique in which an aqueous solution is atomized directly/indirectly into a cryogenic liquid such as liquid nitrogen. In this process, solvents are frozen immediately due to the ultra-rapid freezing rates, thus minimizing the time for phase separation of solutes. Liquid nitrogen is preferred, as its boiling point of −196° C. creates an excellent low temperature atmosphere and it is environmentally-friendly. There are many ways to achieve spray freeze-drying, such as spraying into a cold vapor, spraying into a vapor over a cryo-liquid, and spraying into a cryo-liquid. In comparison with standard spray drying, spray freeze-drying generates powders with larger particle size, no shrinkage, and larger surface area. The current work utilizes spray freeze-drying to produce porous particles with a higher potential for deagglomeration, in order to improve the dispersion of nanoparticles in a polymeric matrix.

Sample Preparation

An example of the experimental protocol for spray freeze-drying is provided. The reinforcement is nanocrystalline cellulose (NCC), but many other agglomerated nanoparticles could also be treated in the same way. Note that clay particles were also used and treated in essentially the same manner.

NCC powder was weighed using a microbalance and dispersed in water at different concentrations at room temperature. For a typical experiment, 0.2-6 grams of NCC powder were dispersed in 100 ml of distilled water, corresponding to NCC concentration of 1-6 wt % using a shear mixer (IKA, ultra-turrax T25, Germany) at room temperature. The resultant NCC suspension was sonicated for 5 minutes in an ice bath with a tip sonicator (Qsonica Q700) at amplitude 2 in order to obtain individual NCC nanoparticles.

Spray Freeze-Drying Setup

FIG. 1 shows the experimental setup for spray freeze-drying. A low concentration suspension of NCC in water is pumped (30 ml/min) using a peristaltic pump into a spray gun (Campbell Hausfeld DH5300, pattern size 8 in.), which is connected into an air pressure line. NCC aqueous suspension is sprayed into a container of 30 cm diameter and 50 cm height containing liquid nitrogen and equipped with a magnetic stirring bar. The distance between the atomizer of the air gun and the liquid nitrogen was set initially at 30 cm. After the spray freezing step, the slurry containing the frozen droplets is transferred to the freeze dryer equipment (Labconco 2.5 L) by first evaporating the excess liquid nitrogen. The frozen droplets are then lyophilized at −52° C. and 0.05 mbar for a period of time that depends on the total amount of material (24-72 h). A freeze drier with a higher capacity can decrease lyophilization time to less than 24 h.

The NCC powder was coated with gold-palladium vapor deposition for a period of 30 s for subsequent examination by field emission scanning electron microscopy (FE-SEM, Hitachi S-4700), operated at 2 kV.

Preparation of the Polymer Composite

Polymer nanocomposite samples were prepared using an internal batch mixer (Rheocord 9000, Haake) employing suitable processing conditions. The Rheocord 9000 Haake internal batch mixer, with a total capacity of 60 ml, operates with two roller blades, in a counter-rotating configuration. Compounding was carried out for 10 minutes under nitrogen atmosphere at 190° C. and 60 rpm rotor speed. NCC powder was fed after polymer granules were melted inside the mixing chamber. Finally, the mixture was collected for further characterization after cooling to room temperature. Results have been generated for polypropylene (PP)/NCC and polylactic acid (PLA)/NCC nanocomposites, but other polymers may be considered, including polyethylene (PE), poly(methyl methacrylate) (PMMA), polyurethanes, epoxies, and polystyrene (PS), among others.

Preparation of Samples for Characterization

Nanocomposite samples collected from the internal batch mixer were molded using a Carver press (Wabash, Ind., USA) to produce disk-shaped specimens. The samples were compression molding at a pressure and temperature of 0.2 MPa and 190° C., respectively, for a period of time ranging from 5 to 8 minutes, depending on the matrix material. The PLA/NCC samples were placed in a cold press to lower the temperature to room temperature after molding.

All rheological measurements were made using a rotational rheometer (MCR 500, Anton Paar, Graz, Austria) model of Anton Paar) with parallel plate geometry (plate diameter of 25 mm) at 190° C. Disk-shaped samples were positioned in the parallel plate fixture and left for 10 minutes to minimize any residual stress resulting from sample preparation. The gap was set at 1 mm by gradually squeezing the sample. Rheological properties of these samples were determined in two modes of operation: Steady Shear and Small Amplitude Oscillatory Shear (SAOS). In SAOS experiments, the linear viscoelastic region was first determined using stress sweep at different frequencies. For this purpose, strain sweep from 1 to 100% at a constant frequency of 1 rad/s was carried out in order to determine the linear viscoelastic region. The linear viscoelastic region was determined by a 5% decrease in the elastic modulus, G', of the sample. The results provided by this test include complex viscosity ($\eta^*$), elastic modulus (G') and loss modulus (G"). These parameters characterize the viscoelastic behavior of the samples. Steady shear tests were carried out to investigate the non-linear behavior of the polymeric nanocomposite samples, which is helpful in terms of processing and structure characterization.

Mechanical testing of the nanocomposites was performed on compression molded samples. Dumbbell-shaped specimens (gage length×width×thickness=15×5×0.5 mm$^3$) were cut from molded sheets using a Tensilekut I-series sample milling machine (Maryville, Tenn., USA) for tensile testing according to ASTM D 882-9. The tensile tests were conducted with an MTS Universal Tensile Testing machine (Eden Prairie, Minn., USA). A crosshead speed of 5 mm/min was used for all tests.

Dynamic mechanical thermal analyser (DMTA®2980, TA Instruments Inc., DE, USA) tests were performed on compression molded samples with a thickness, width, and height of 2 mm, 20 mm, and 65 mm, respectively. The specimens were tested in the dual cantilever bending mode at 30 micron amplitude, with a frequency of 1 Hz, under nitrogen atmosphere. Different heating rates were used, depending on the polymer matrix.

Powder Morphology of NCC Nanoparticles

Figure 2:
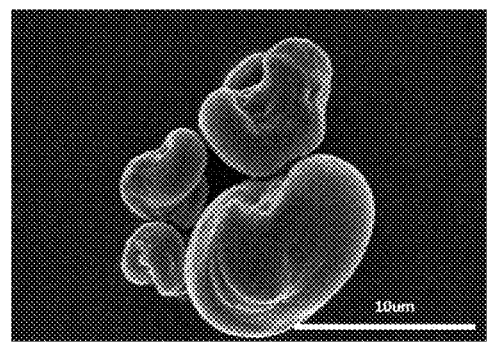
FIGS. 2 to 6 are SEM images of spray dried and spray freeze-dried NCC at various magnifications.
Figure 3:
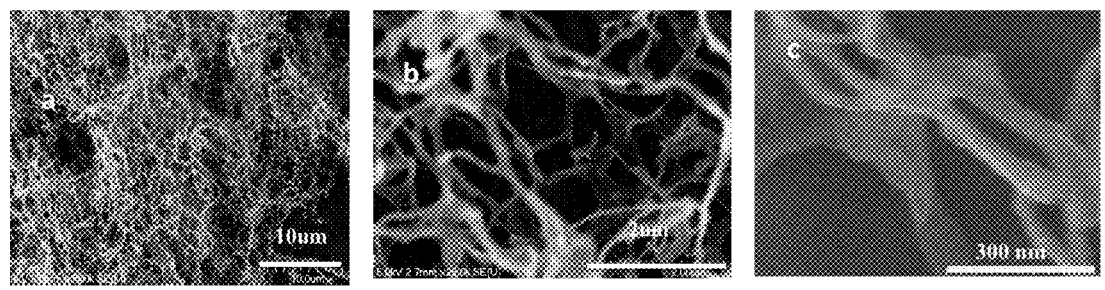
Figure 4:
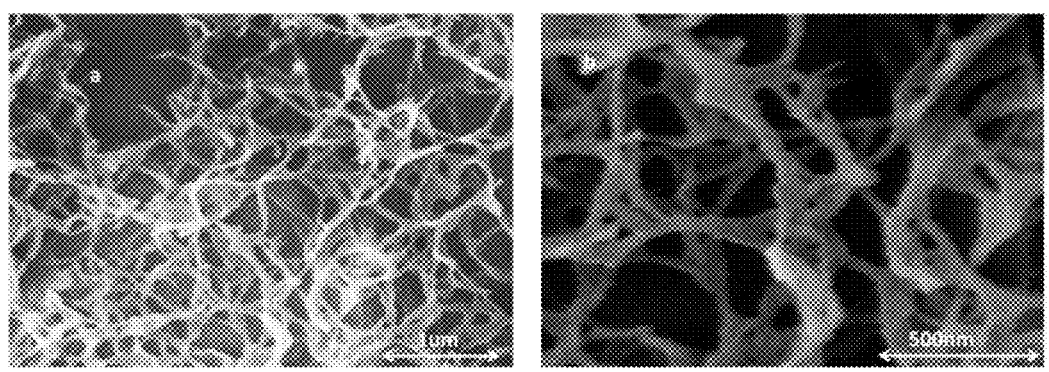
Figure 5:
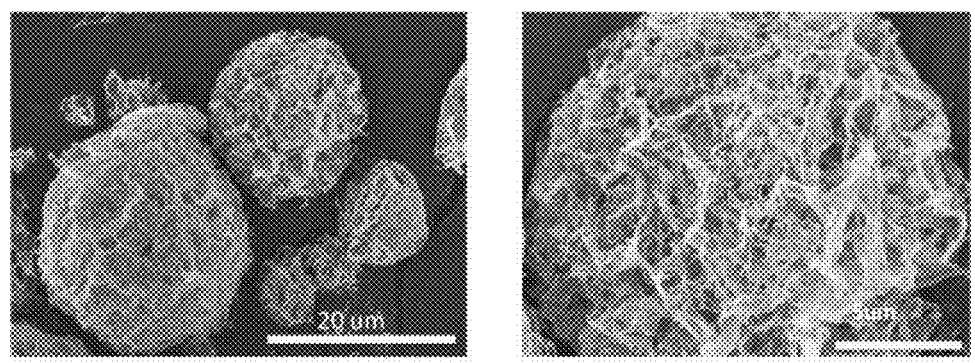
Figure 6:
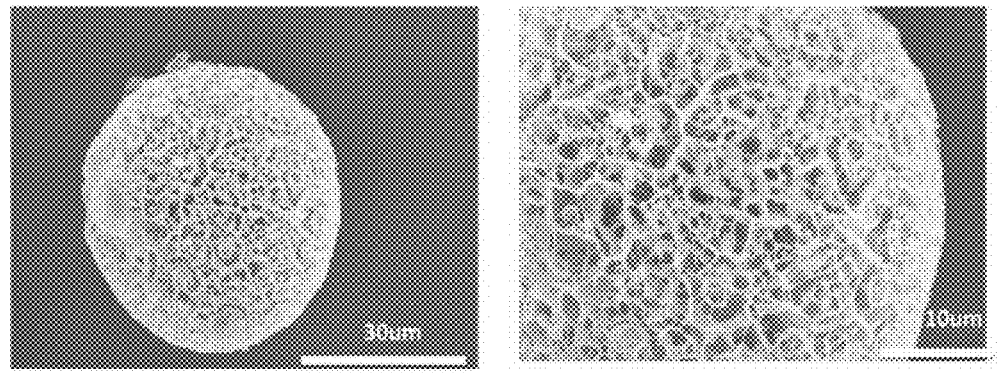

The scanning electron microscopy (SEM) image of spray dried NCC in FIG. 2 indicates a dense structure particle. FIGS. 3-6 show SEM images of spray freeze dried particles obtained from aqueous NCC suspensions at different concentrations: 0.2, 0.5, 1, 2 and 6 wt %. There are two types of morphology, depending on the NCC concentration. At concentrations below about 2 wt %, a porous non-aggregated structure of NCC is formed (FIG. 3 and FIG. 4). In this regime, there is no structural integrity due to a low number density of NCC particles inside the drop after the atomizer. On the other hand, at higher concentrations of 2 and 6 wt %, spherical foam structure particles are formed as seen in FIGS. 5 and 6.

BET Results of NCC Nanoparticles

Figure 7:
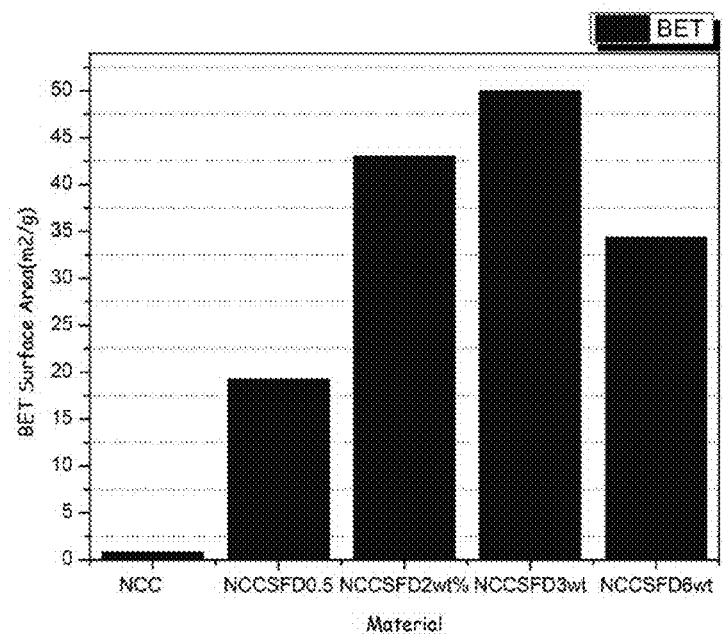
FIG. 7 shows BET (Brunauer-Emmett-Teller) surface area results for spray dried NCC, freeze-dried NCC, and spray freeze-dried NCC.

FIG. 7 shows BET (Brunauer-Emmett-Teller) surface area results for spray dried NCC, freeze-dried NCC, and spray freeze-dried NCC. The specific area obtained for spray dried and freeze-dried NCC is very low (less than 1 m$^2$/g). This means that $N_2$ gas could not penetrate the material, since the particles have a very dense structure. However, BET surface area for spray freeze-dried NCC is significantly larger in comparison with the spray dried NCC. It is important to note that BET pore size measurement range is limited from micropores (less than 2 nm) to meso pores (less than 500 nm). Therefore, this technique cannot estimate total surface area of the powder. Therefore, BET surface area calculations underestimate the actual surface area of spray freeze-dried NCC. The specific surface area of spray freeze-dried NCC is much higher than obtained by the BET method.

It is expected that the new open structure of the spray freeze-dried particles would improve the efficiency of functionalization of the particles and increase the effectiveness of compatibilization to enhance interactions between the particles and polymeric matrix. The loading level of the spray freeze-dried nanoparticles can be varied to optimize the rheology and properties for specific applications.

Polarized Light Microscopy

Figure 8:
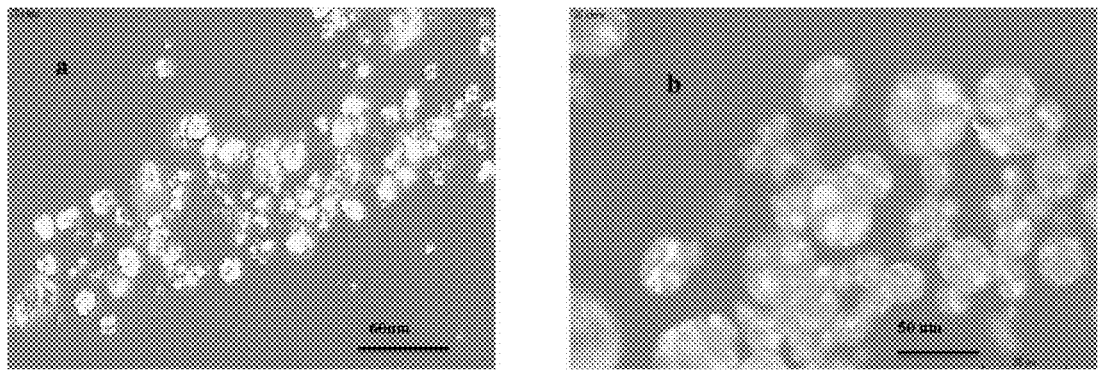
FIG. 8 is PLM images of (a) spray dried NCC and (b) spray freeze-dried NCC suspension (2 wt %) at magnification 20×.

FIG. 8 compares polarized light microscopy (PLM) observations for (a) NCC as-is (i.e. spray dried NCC) and (b) spray freeze-dried 2 wt % NCC suspension labeled as NCCSFD2. As mentioned earlier, particles prepared using spray drying undergo shrinkage due to water evaporation and yield a dense structure due to capillary forces. Therefore, the size of particle produced using spray drying should be smaller than for particles produced by spray freeze-drying, since the structure is frozen-in during spray freeze-drying. This is supported by the image shown in FIG. 8b for NCCSFD2, where a larger size particle is obtained.

Figure 9:
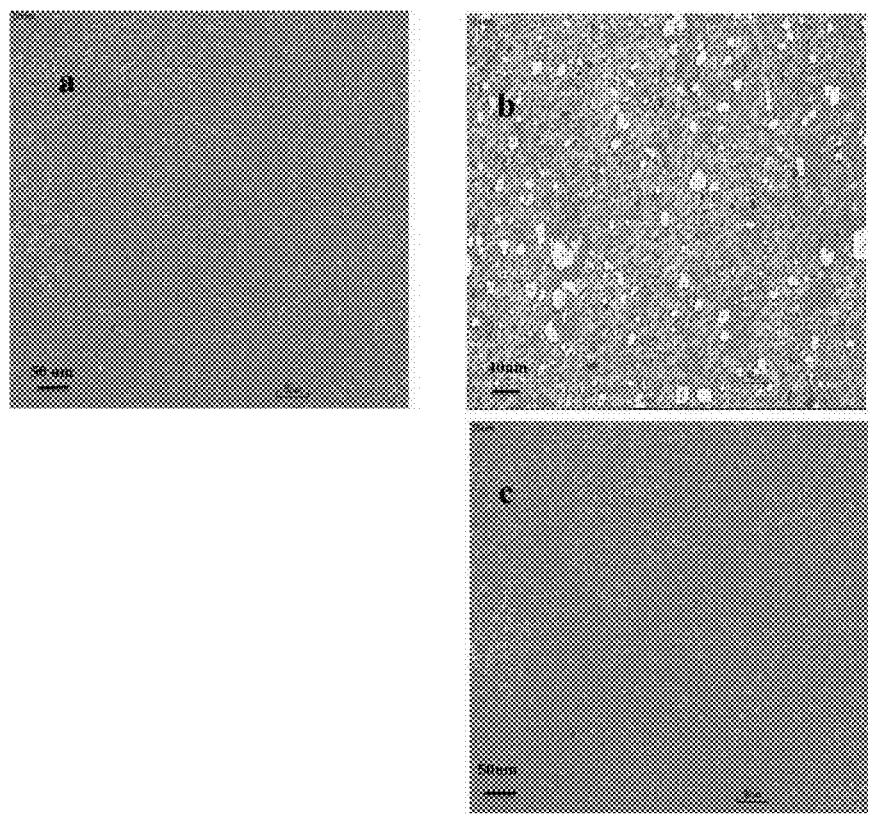
FIG. 9 is PLM images of a) polypropylene (PP), b) polypropylene with 4% wt NCC, and c) polypropylene with 2 wt % spray freeze-dried at magnification 10×.

FIG. 9 shows PLM images for moldings of unfilled PP (FIG. 9a), PP containing 4 wt % NCC (FIG. 9b), and PP containing 2 wt % NCCSFD2 (FIG. 9c), respectively. In light of the observations from FIG. 8a, it can be safely concluded that the shiny yellow objects in FIG. 8b are NCC particles. It seems that NCC particle size remains almost intact (the same as the original size) with no particle size reduction as a result of melt mixing with the PP matrix. FIG. 9c shows the PLM image for NCCSFD2 in the PP matrix, obtained at the same processing condition. There is no trace of large particles at this scale of observation. This shows that it is much easier to deagglomerate or disperse the highly porous spray freeze-dried NCC particles than the compact particles obtained by conventional spray drying.

Figure 10:
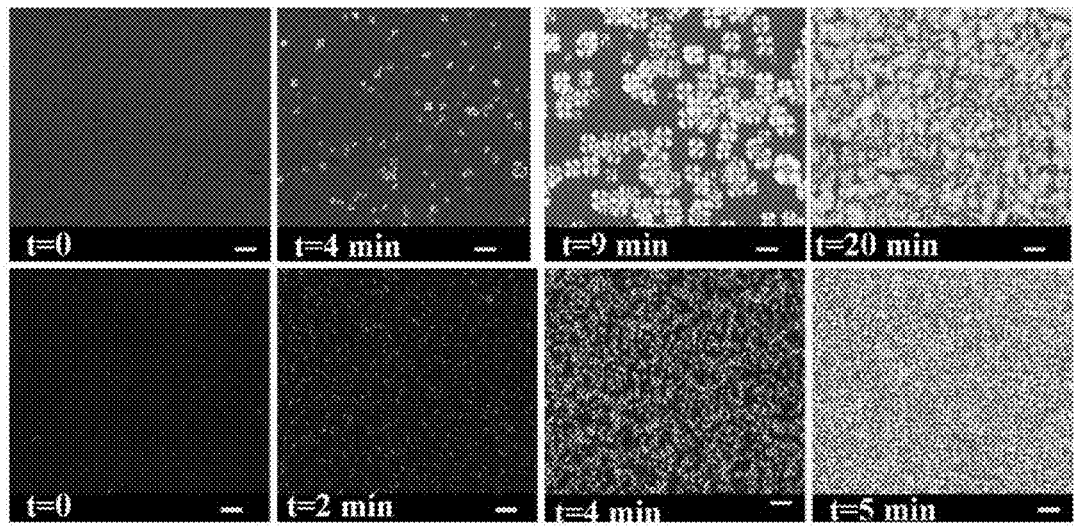
FIG. 10 is PLM micrographs for isothermal crystallization at 120° C.

Similar behavior was observed for PLA/NCC nanocomposites. FIG. 10 displays polarized light microscopy images of isothermal crystallization for PLA and PLA/NCCSFD at 120° C. As expected, PLA displayed a typical spherulitic morphology. Moreover, PLA crystal growth continued for 20 minutes to achieve complete crystallization, demonstrating a slow crystallization rate. The addition of NCCSFD particles had a profound influence on PLA crystal morphology. In comparison with PLA, a high nucleation density, smaller spherulitic dimension, and more rapid crystallization speed were observed for the PLA/NCCSFD3 system.

Rheology

Rheology describes the resistance of a liquid material to flow. Rheology can be used as a complementary characterization tool to investigate the microstructure in polymer nanocomposite systems. The following rheological properties of different samples were measured to evaluate the dispersion of spray dried and spray freeze-dried NCC in polypropylene:

Neat polypropylene (PP)
Polypropylene reinforced with 5 wt % NCC, no spray freeze-drying (PP-NCC)
Polypropylene reinforced with 1.5, 2.5, 5, and 6 wt % NCC, with spray freeze-drying (PP-NCCSFD1)
Polypropylene reinforced with 2.5 wt % and 6 wt % NCC, with spray freeze-drying of a 2 wt % NCC suspension (PP-NCCSFD2)

Figure 11:
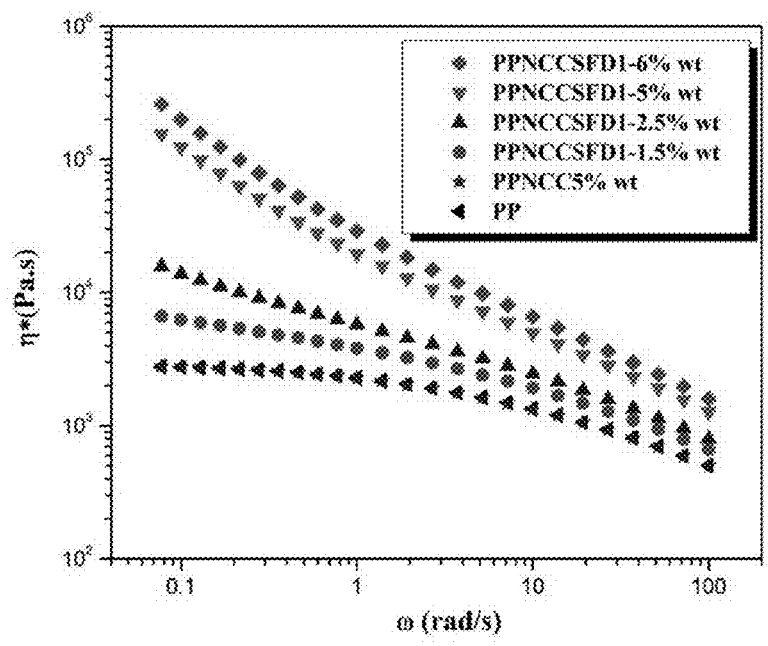
FIG. 11 illustrates complex viscosity of PP, incorporating 5 wt % spray dried NCC and spray freeze-dried NCC at different concentrations.
Figure 12:
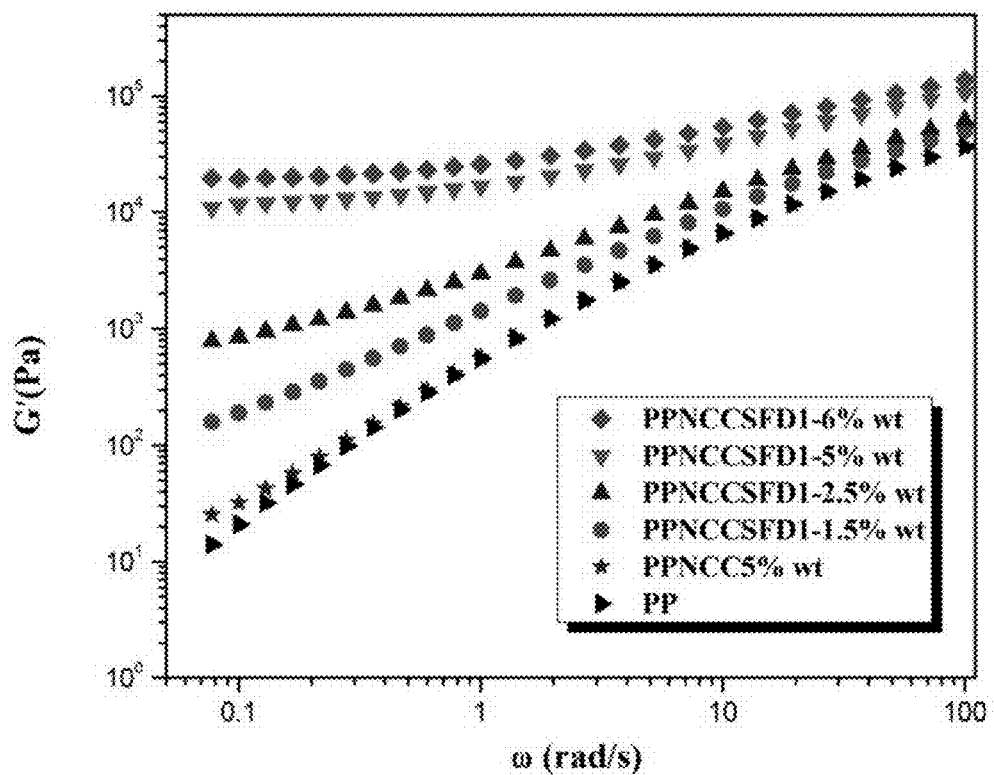
FIG. 12 illustrates the storage modulus of PP, incorporating 5 wt % spray dried NCC and spray freeze-dried NCC at different concentrations.
Figure 13:
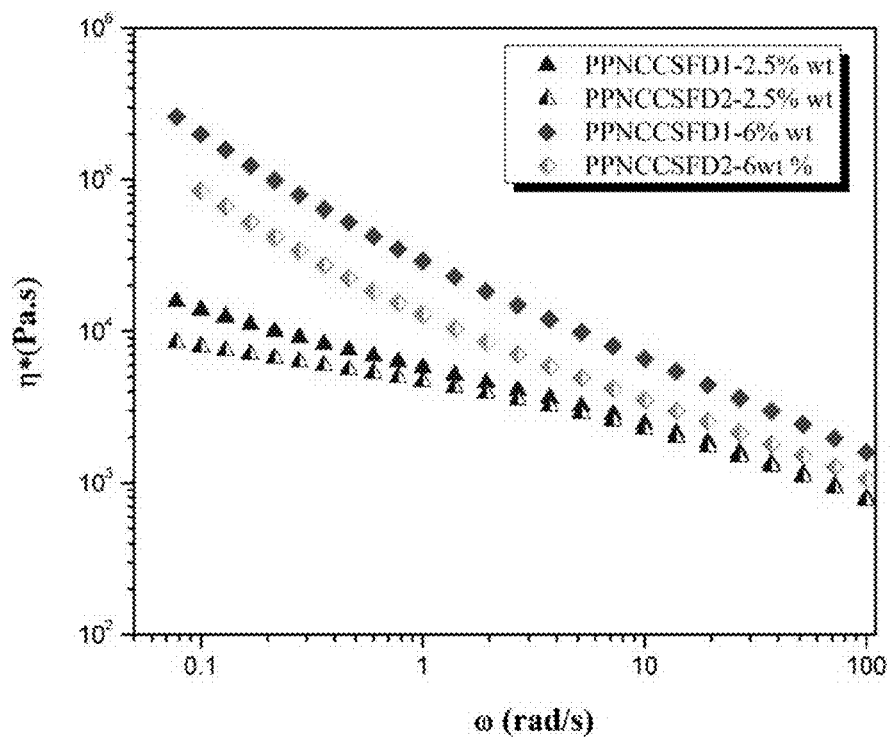
FIG. 13 illustrates the complex viscosity versus angular frequency for PP filled with spray freeze-dried NCC.
Figure 14:
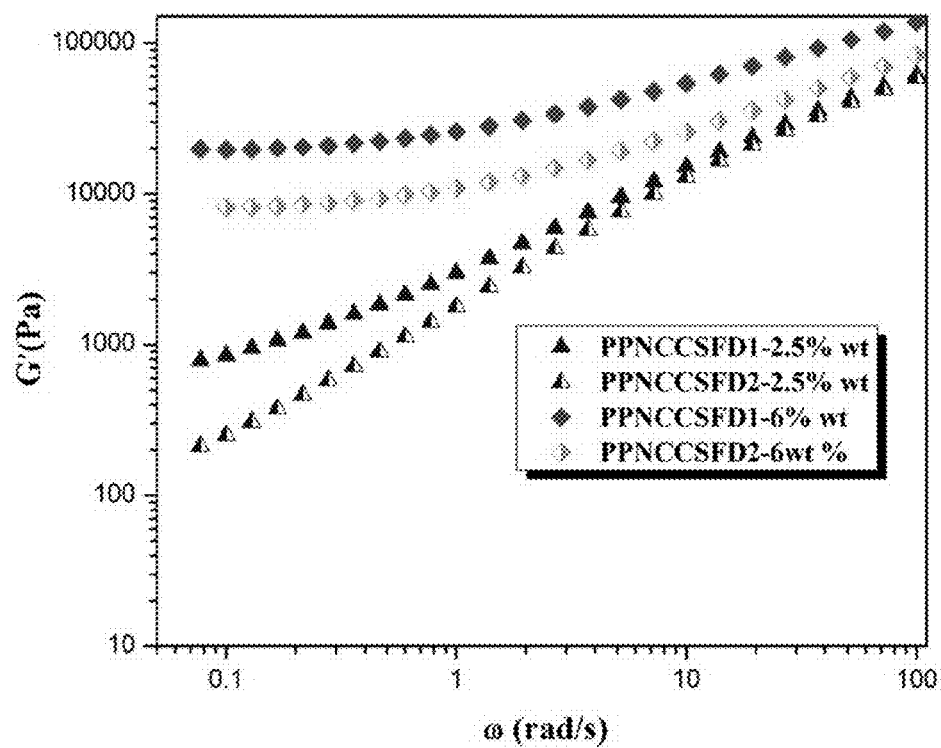
FIG. 14 illustrates the storage modulus versus angular frequency for PP filled with spray freeze-dried NCC.

The nanoparticle composites that were spray freeze-dried showed distinctly different rheology compared to either the neat polymer or the composite where the nanoparticles were added without undergoing spray freeze-drying. The results clearly indicate that adding the NCC without utilizing the spray freeze-drying did not modify the viscosity of the base resin. However, the sample where the NCC underwent spray freeze-drying showed a significant increase in viscosity. FIG. 11 shows how viscosity is changing with increasing concentration of NCCSFD1. There is a substantial increase in complex viscosity, even at a low concentration of NCC (1.5 wt %). A similar observation was made for the storage modulus, which is a measure of the elasticity of the sample (FIG. 12). Spray freeze-drying the nanoparticles prior to addition in the polypropylene changed the inherent rheology of the base resin, thus indicating that the reinforcement is effectively dispersed within the resin. FIGS. 13 and 14 compare the effect of NCC powder structure on rheological properties. As discussed above, two kinds of structure can be produced by the spray freeze-drying technique, depending on the initial concentration of NCC suspension before spraying liquid nitrogen. The rheological results indicate that the non-aggregated structure (NCCSFD1) is more effective than the spherical foam particle (NCCSFD2) in term of increasing complex viscosity (FIG. 13) and storage modulus (FIG. 14).

Figure 15:
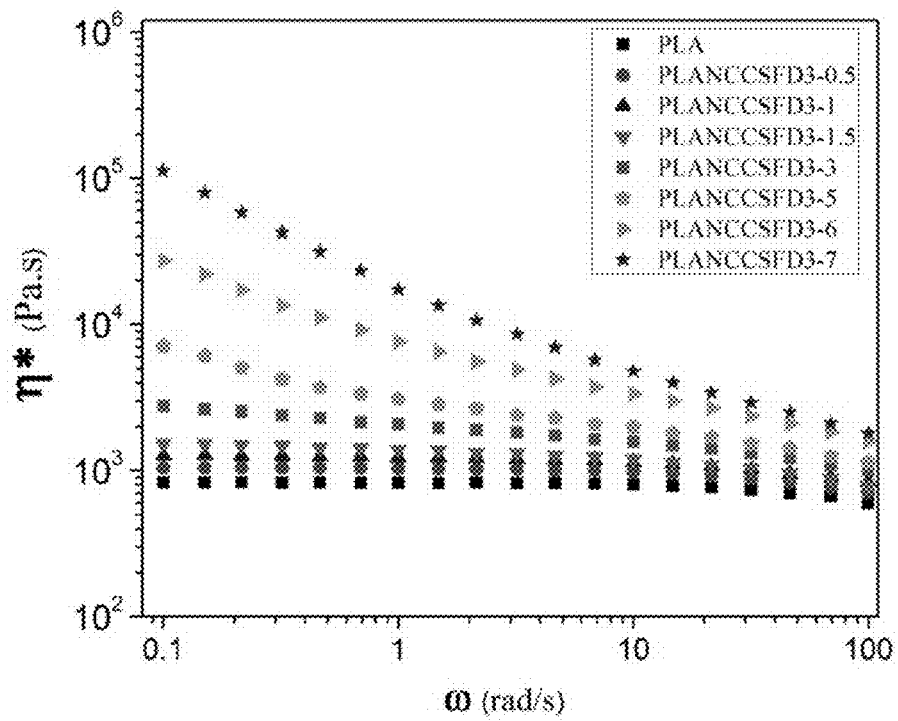
FIG. 15 illustrates the complex viscosity results for polylactic acid (PLA) and PLA with different spray freeze-dried NCC contents.

The rheological behavior of PLA/NCC nanocomposites was also studied. The concentration of the particles was varied from 0.5 to 7 wt %. As with the polypropylene samples, the rheology of the PLA was significantly impacted by the presence of the spray freeze-dried NCC particles. As shown in FIG. 15, complex viscosity increased monotonically by the addition of NCCSFD3 agglomerates into the PLA melt. For concentrations below 3 wt %, the complex viscosity at low frequencies increased and the system did not display any shear thinning behavior at these concentrations. However, at 3 wt % NCCSFD3 concentration and above, the complex viscosity not only increased but also exhibited a shear thinning behavior at low frequencies. This is an indication of occurrence of structure formation within the PLA melt due to particle-particle interaction. Increasing NCCSFD3 concentrations above 3 wt % results in rapidly growing low frequency viscosities of PLA, until the system resists flow at higher concentrations, such as 7 wt %.

Figure 16:
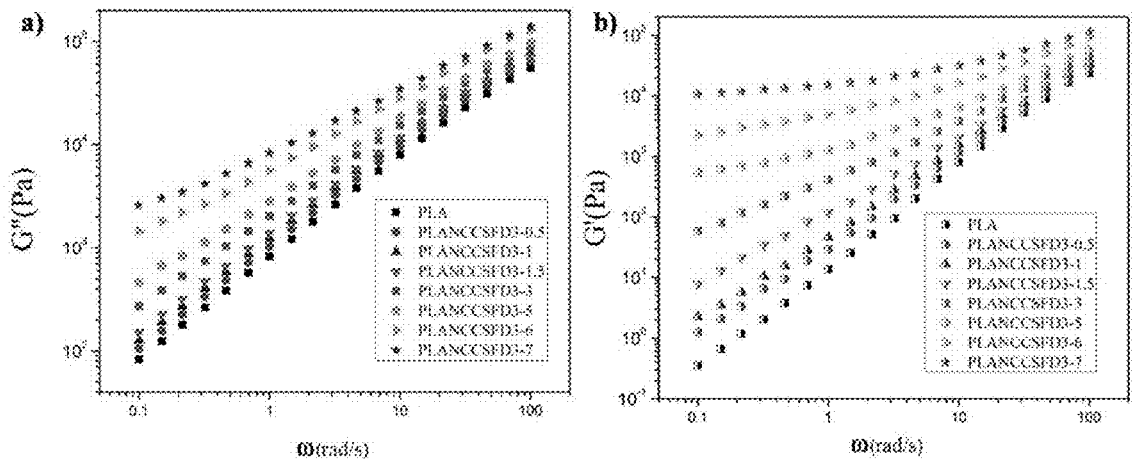
FIG. 16 illustrates the storage (a) and loss (b) moduli of PLA and PLA comprising spray freeze-dried NCC at different concentrations.

The storage and loss moduli also demonstrated the effect of the NCC reinforcement on the rheology of PLA. FIG. 16 compares the behavior of neat PLA and PLA filled with NCCSFD. A significant increase in the storage and loss moduli of PLA is obtained upon addition of NCCSFD. The transition from liquid to solid-like behavior was observed at NCCSFD3 concentration above 5 wt % where the storage modulus met and exceeded the loss modulus. This is an indication of the network formation caused by dispersed NCCSFD within PLA as a result of increased particle number density. The improved aforementioned rheological properties originated from the created high surface area of porous NCCSFD3 agglomerate structure within PLA and PP, as a result of effective de-agglomeration to capitalize on the benefits of NCC nanoparticles.

Figure 17:
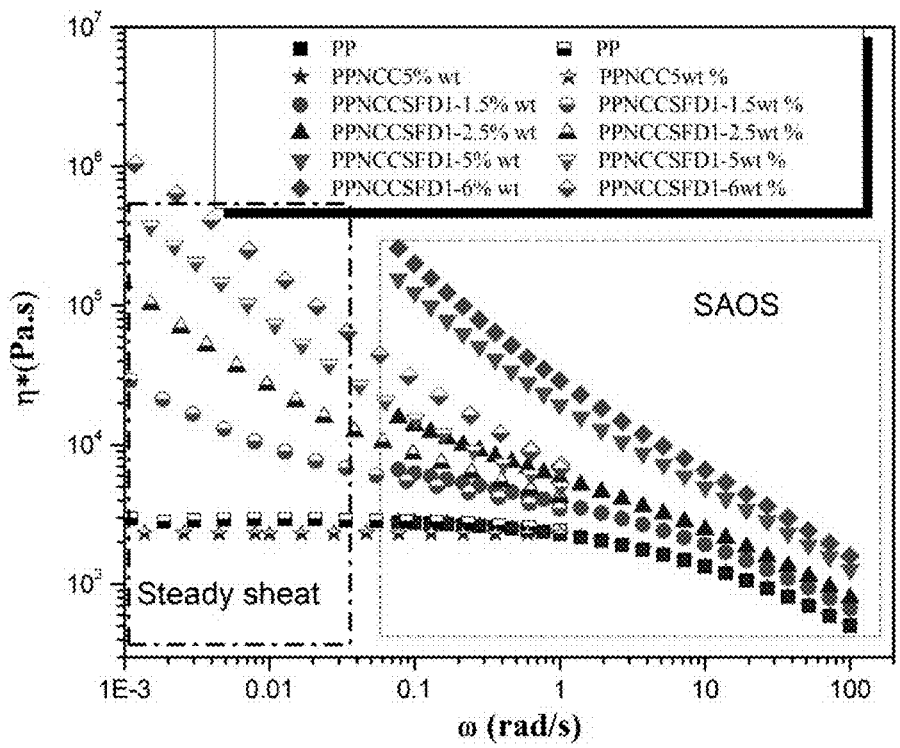
FIG. 17 illustrates the steady shear viscosity and complex viscosity versus shear rate and angular frequency.

Nonlinear rheological properties of PP containing NCC were also studied. Steady shear viscosity can be estimated from complex viscosity in SAOS tests by using the empirical Cox-Merz rule at equivalent shear rate and frequency, per FIG. 17. However, for structured materials such as highly filled polymers and liquid crystal polymers, the Cox-Merz rule fails. The only possibility for this failure in PP containing NCCSFD is due to the dispersion of NCC nanoparticles and the formation of a structure inside the PP. The results of steady shear viscosity versus shear rate are provided in FIG. 17. PP and PPNCC5% wt show typical non-Newtonian behavior, with the viscosity approaching a flat Newtonian plateau at low shear rates. In comparison, NCCSFD1 exhibits pronounced shear thinning behavior, and the steady shear viscosity shows increasing viscosity with decreasing shear rate. At a high shear rate, the viscosities of nanocomposites and the PP matrix appear to converge, perhaps due to orientation of anisotropic particles induced by the flow field.

Dynamic Mechanical Analysis

Dynamic mechanical properties refer to the response of a material as it is subjected to a periodic force. Dynamic Mechanical Analysis (DMA) can generate phase transition data for polymers and composites over a range of temperatures or frequencies. Results for DMA testing are shown in FIG. 18 for four samples:

Neat polypropylene (PP)
Polypropylene reinforced with 6 wt % NCC, no spray freeze-drying (PP-NCC6)
Polypropylene reinforced with 6 wt % NCC, with spray freeze-drying (PP-NCCSFD1-6)
Polypropylene reinforced with 5 wt % NCC, with spray freeze-drying (PP-NCCSFD1-5)

Figure 18:
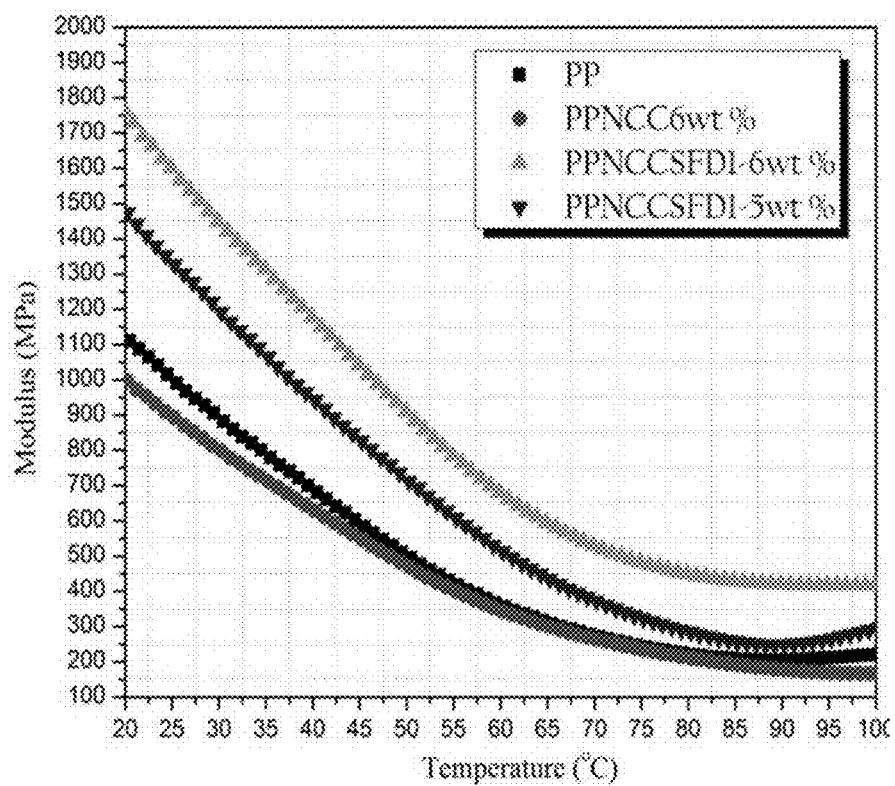
FIG. 18 illustrates the storage modulus versus temperature for PP containing NCC and spray freeze-dried NCC.

The DMA profile in FIG. 18 for sample PP-NCC6 is very similar to the PP material, indicating minimal impact of the NCC on the base resin. The two samples where the NCC was spray freeze-dried exhibit significantly higher modulus values over the entire range of temperatures. At 20° C., the modulus values for PP-NCCSFD1-6 and PP-NCCSFD1-5 were approximately 50% and 80% higher, respectively, than for the base PP. As with the rheology results, spray freeze-drying the nanoparticles prior to compounding caused a substantial and measurable change in the dynamic mechanical behavior.

Mechanical Properties

The addition of a reinforcement typically improves the mechanical properties of the base resin. Tensile properties were measured to determine the impact of spray freeze-drying of the particles on the tensile strength, elongation at break, and modulus of the composite samples. Four samples were compared:

Neat polypropylene (PP)
Polypropylene reinforced with 5 wt % NCC, no spray freeze-drying (PPNCC5)
Polypropylene reinforced with 6 wt % NCC, with spray freeze-drying (PPNCCSFD2-6)
Polypropylene reinforced with 5 wt % NCC, with spray freeze-drying (PPNCCSFD0.5-5)

Figure 19:
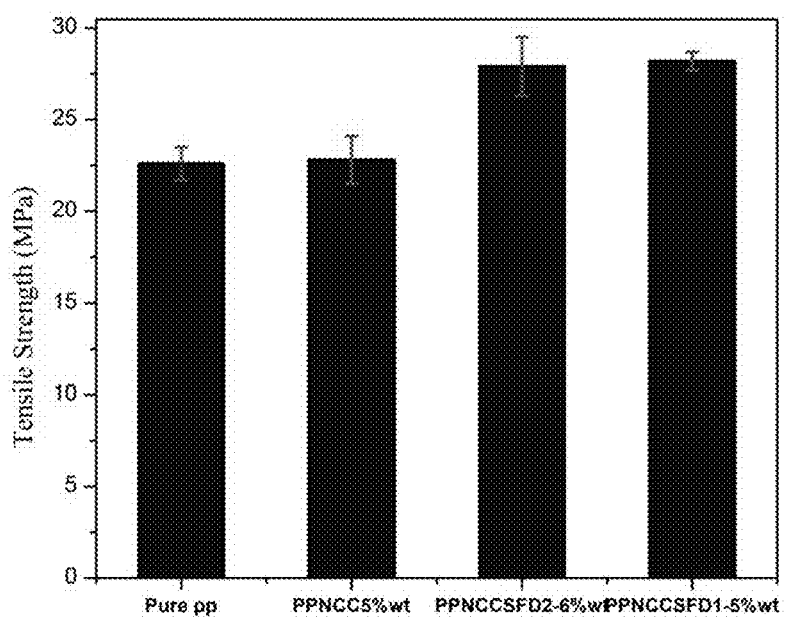
FIGS. 19 to 21 respectively illustrate the tensile strength, tensile modulus and elongation at break of PP and PP containing NCC and spray freeze-dried NCC.

FIG. 19 gives the results for the tensile strength. The samples where the NCC nanoparticles were spray freeze-dried showed an increase in strength of greater than 20% compared to the pure PP or the PPNCC5 sample.

Figure 20:
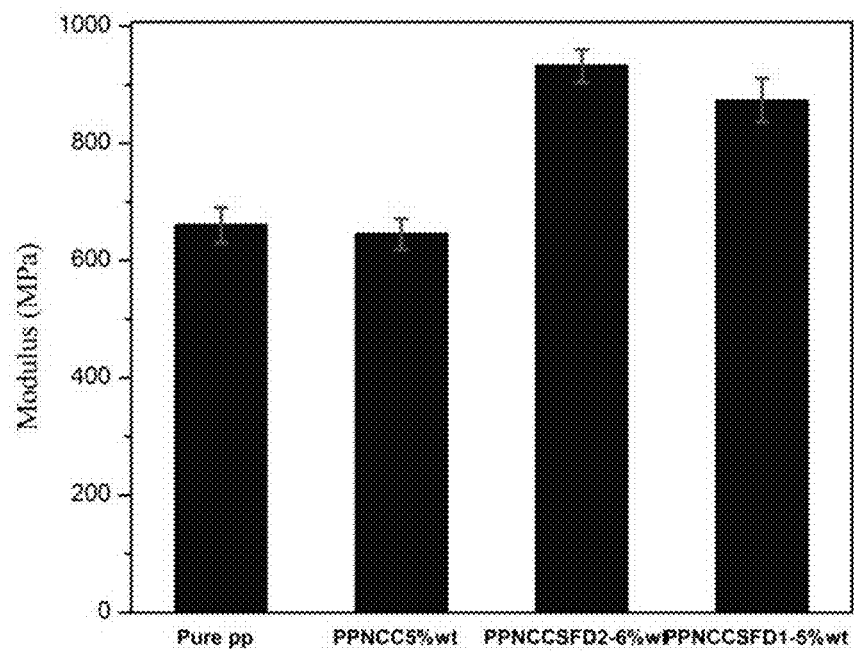

The results from the measurement of the modulus are provided in FIG. 20. The moduli of samples incorporating spray freeze-dried NCC particles, PPNCCSFD2-6 and PPNCCSFD0.5-5, were higher than the modulus of PP by 43% and 34%, respectively. Adding the non-spray freeze-dried NCC particles directly to the PP did not show any enhancement of the PP modulus. As a stiffer material is desirable for many applications, the increase in modulus due to spray freeze-drying the NCC particles is particularly advantageous.

Figure 21:
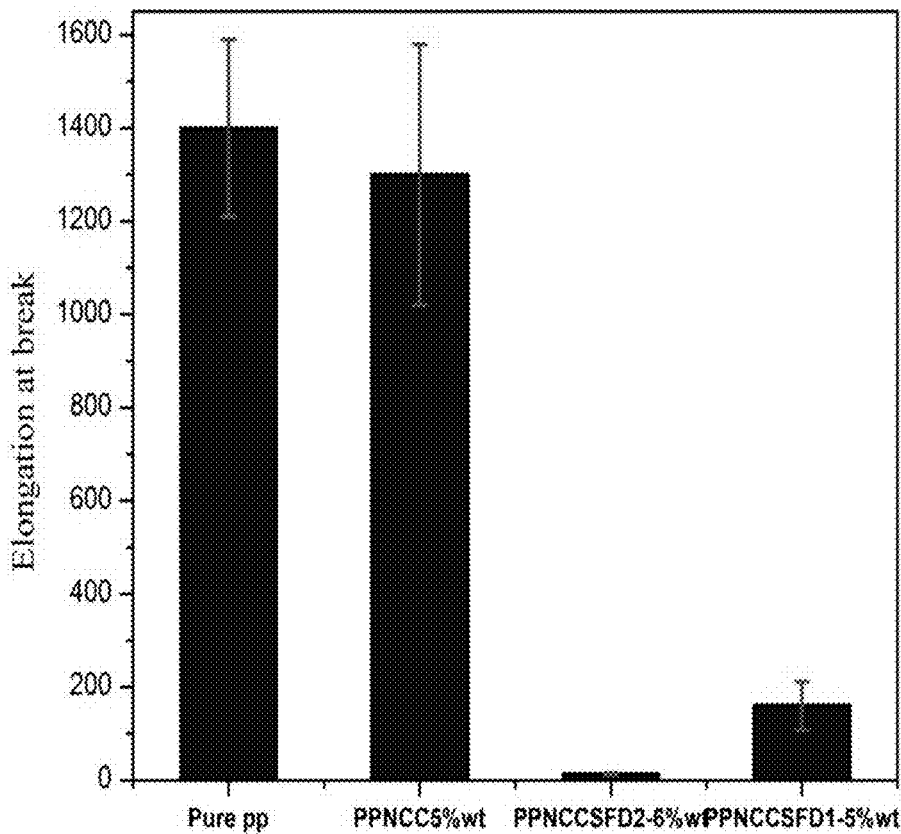

A comparison of the elongation at break values is provided in FIG. 21. As expected, the elongation at break is decreased with the addition of the reinforcement. The sample that was reinforced with NCC, but not spray freeze-dried NCC, did not show a large decrease, which is reasonable as this addition method had minimal impact on rheology, crystallinity, or mechanical properties. However, sample PPNCCSFD0.5-5 had an elongation at break approaching 200%, which is impressive considering the significant level of enhancement of mechanical properties. As the concentration on SFDNCC increases to 6 wt %, the elongation at break is reduced, as expected. However, these results suggest the possibility of balancing the gains in strength and modulus with the tensile elongation by manipulating the SFDNCC loading.

Powder Morphology of Clay particles

Figure 22:
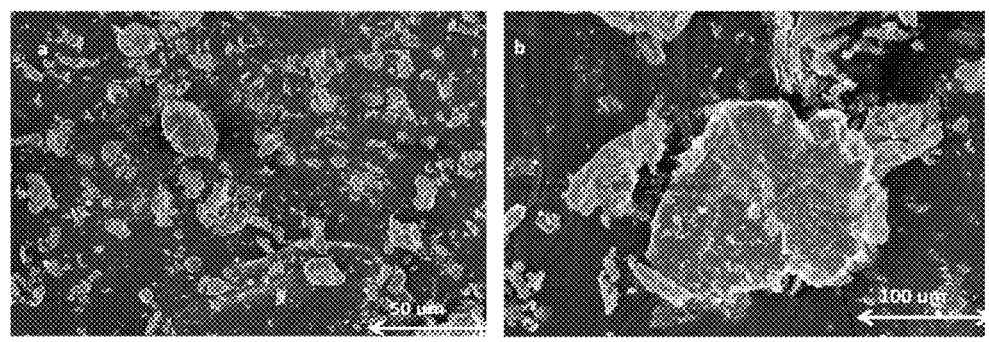
FIGS. 22 and 23 are SEM micrographs of commercial clay and spray freeze-dried clay respectively at various magnifications.
Figure 23:
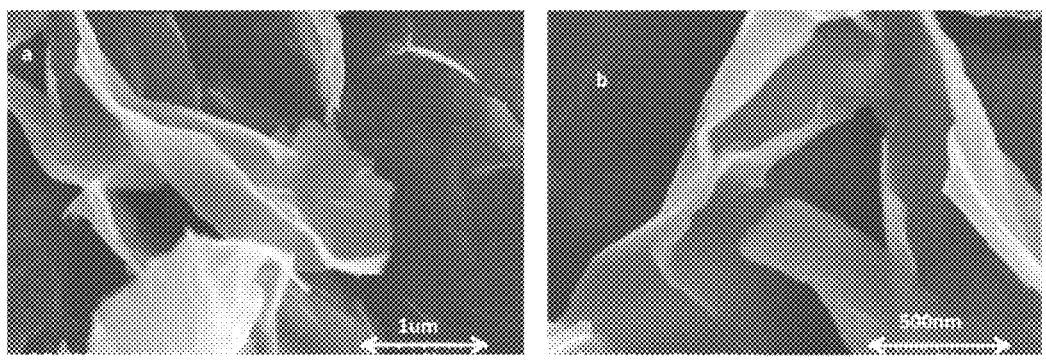

FIG. 22 shows SEM results for commercial clay. Clay particles have an irregular shape with a broad range of particle sizes from 10-150 µm. The SEM images of spray freeze-dried clay are shown in FIG. 23. Isolated layers of clay with thickness of approximately 2-5 nm can be seen. As mentioned above, in the spray freeze-drying technique, the morphology of the nanoparticle in the feed water suspension is preserved and frozen-in under cryogenic conditions.

X-Ray Diffraction

X-ray diffraction (XRD) is a common tool used to infer the degree of crystallinity and the orientation of the crystals. XRD patterns for a clay nanocomposite and a neat clay sample were compared. Both particles show a peak at 2 theta around 8°, which reflects the standard d-spacing between the clay particles for unmodified clay. It should be noted, however, that the peak is sharper and more pronounced for the unmodified clay than for the spray freeze-dried system. This suggests the possibility of a broader distribution d-spacing in the spray freeze-dried sample. More specifically, the new peak that appears at the smaller 2 theta of around 3.5° for the spray freeze-dried sample suggests the existence of a significant proportion of clay particles with substantially larger d-spacing. This indicates that the spray freeze-dried sample has undergone a significant degree of intercalation, which is an important requirement in the formation of nanocomposites.

Spray freeze-drying of nanoparticles prior to their incorporation into a polymer has provided advantageous properties to a resulting polymer matrix. The spray freeze-drying technique does not utilize harmful materials, and can be used with a variety of different nanoparticles.

Results comparing composites with spray freeze-dried nanoparticles to those with direct addition of the nanoparticles (no spray freeze drying) showed the following advantages for the spray freeze-drying technique:

higher viscosity and storage modulus;
increased dynamic modulus;
increased tensile strength and modulus, with the possibility of controlling elongation at break within a practical range;
that the nanoparticles produced by spray freeze-drying form new structures within the nanocomposite, which are reflected in the favorable rheological and mechanical properties of the composites;
the loading level of the spray freeze-dried nanoparticles and the concentration of nanoparticles in the dispersion along with the spray freeze-drying conditions can be varied to optimize the rheology and mechanical properties for specific applications.

The embodiments of the invention described above are intended to be exemplary. Those skilled in the art will therefore appreciate that the foregoing description is illustrative only, and that various alternate configurations and modifications can be envisaged. Accordingly, the present invention is intended to embrace all such alternate configurations, modifications and variances which fall within the scope of the appended claims, that should not be limited by the preferred embodiments set forth in the examples, but should be given the broadest interpretation consistent with the description as a whole.

The invention claimed is:

1. A process for preparing a polymer nanocomposite comprising:
   i) providing a spray freeze-dried nanoparticle agglomerate, said step i) comprising:
      a) dispersing an agglomerated material in a liquid medium to provide a dispersion; and
      b) spray freeze-drying said dispersion; and
   ii) dispersing said spray freeze-dried nanoparticles in said polymer.

2. The process of claim 1, wherein the nanoparticles are one of nanocrystalline cellulose and clay.

3. The process of claim 1, wherein the nanoparticles are one of nanocrystalline cellulose.

4. The process of claim 1, wherein the polymer is polypropylene, polyethylene, polylactic acid, poly(methyl methacrylate), polyurethane, epoxy or polystyrene.

5. The process of claim 1, comprising dispersing at least about 0.1 wt % of said spray freeze-dried nanoparticles in said polymer composite.

6. The process of claim 1, wherein said liquid medium is consisting essentially of water.

7. The process of claim 1, wherein said dispersion is comprising up to 10 wt % agglomerated particles in said liquid medium.

8. The process of claim 1, wherein said spray freeze-dried nanoparticle is spray freeze-dried nanocrystalline cellulose (SFD-NCC) wherein the ratio of Brunauer-Emmett-Teller (BET) surface area of said SFD-NCC over spray dried nanocrystalline cellulose (SD-NCC) or freeze-dried nanocrystalline cellulose (FD-NCC) is:

$$\frac{SFD\text{-}NCC}{SD\text{-}NCC \text{ or } FD\text{-}NCC} \geq \text{about } 10.$$

9. A process for preparing a polymer nanocomposite comprising:
   i) providing a spray freeze-dried nanoparticle agglomerate, wherein said nanoparticle is one of nanocrystalline cellulose and clay, said step i) comprising:
      a) dispersing up to 10 wt % of an agglomerated material comprising nanocrystalline cellulose or clay in a liquid medium to provide a dispersion; and
      b) spray freeze-drying said dispersion; and
   ii) dispersing at least about 0.1 wt % of said spray freeze-dried nanoparticles in said polymer, wherein the polymer is polypropylene, polyethylene, polylactic acid, poly(methyl methacrylate), polyurethane, epoxy or polystyrene.

\* \* \* \* \*